(12) United States Patent
Sueyoshi et al.

(10) Patent No.: US 9,388,902 B2
(45) Date of Patent: Jul. 12, 2016

(54) PISTON BEARING STRUCTURE FOR FLUID PRESSURE CYLINDER

(75) Inventors: Daisuke Sueyoshi, Kani (JP); Hiroyuki Emoto, Kakamigahara (JP); Tomoko Imahori, Kani (JP); Shusaku Saita, Kani (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 13/809,491

(22) PCT Filed: Feb. 24, 2012

(86) PCT No.: PCT/JP2012/054576
§ 371 (c)(1),
(2), (4) Date: Jan. 10, 2013

(87) PCT Pub. No.: WO2012/127980
PCT Pub. Date: Sep. 27, 2012

(65) Prior Publication Data
US 2013/0113165 A1    May 9, 2013

(30) Foreign Application Priority Data

Mar. 23, 2011  (JP) .................................. 2011-063703

(51) Int. Cl.
*F16J 9/12* (2006.01)
*F16J 15/16* (2006.01)
*F15B 15/14* (2006.01)

(52) U.S. Cl.
CPC ........... *F16J 15/166* (2013.01); *F15B 15/1452* (2013.01)

(58) Field of Classification Search
USPC ................................. 277/435, 436, 440, 449
See application file for complete search history.

(56) References Cited

U.S. PATENT DOCUMENTS

| 1,686,090 A | * | 10/1928 | MacClatchie | 277/460 |
| 2,520,306 A | * | 8/1950 | Detweiler | 277/448 |
| 2,799,523 A | * | 7/1957 | Parker | 277/449 |
| 2,873,132 A | * | 2/1959 | Tanner | 277/436 |
| 3,158,376 A | * | 11/1964 | Rentschler | 277/566 |
| 3,189,359 A | * | 6/1965 | Haberkorn | 277/566 |
| 3,189,360 A | * | 6/1965 | Haberkorn | 277/566 |

(Continued)

FOREIGN PATENT DOCUMENTS

| JP | 51-003854 B1 | 2/1976 |
| JP | 55-22591 U | 2/1980 |

(Continued)

OTHER PUBLICATIONS

International Search Report and Written Opinion corresponding to PCT/JP2012/054576, dated Mar. 27, 2012.

*Primary Examiner* — Kristina Fulton
*Assistant Examiner* — Eugene G Byrd
(74) *Attorney, Agent, or Firm* — Hauptman Ham, LLP

(57) ABSTRACT

A piston bearing structure for a fluid pressure cylinder includes one seal ring which is housed in a housing groove of a piston and is held in sliding contact with a cylinder tube and two backup wear rings which is housed in a housing groove of a piston, is held in sliding contact with a cylinder tube and sandwiches the seal ring. The backup wear ring includes a pressure relief groove which faces the housing groove and extends over the backup ring portion and the wear ring portion, and the pressure relief groove allows opposite sides of the backup wear ring to communicate between the piston and the cylinder tube.

5 Claims, 4 Drawing Sheets

(56) References Cited

U.S. PATENT DOCUMENTS

| | | | |
|---|---|---|---|
| 3,473,814 A * | 10/1969 | Bastow | 277/562 |
| 3,542,380 A * | 11/1970 | Klein et al. | 277/639 |
| 3,583,712 A | 6/1971 | Domros et al. | |
| 3,678,809 A * | 7/1972 | Doutt | 92/86 |
| 3,854,737 A * | 12/1974 | Gilliam, Sr. | 277/566 |
| 3,920,252 A * | 11/1975 | Dechavanne | 277/437 |
| 3,930,657 A * | 1/1976 | Svensson et al. | 277/584 |
| 4,059,280 A * | 11/1977 | Eastwood | 277/562 |
| 4,089,534 A * | 5/1978 | Litherland | 277/566 |
| 4,438,938 A * | 3/1984 | Armell | 277/627 |
| 4,468,041 A * | 8/1984 | Yoshimura et al. | 277/584 |
| 4,475,738 A * | 10/1984 | Eicher et al. | 277/345 |
| 4,576,386 A * | 3/1986 | Benson et al. | 277/584 |
| 4,819,952 A * | 4/1989 | Edlund | 277/589 |
| 5,390,939 A * | 2/1995 | Terauchi et al. | 277/650 |
| 5,524,905 A * | 6/1996 | Thoman et al. | 277/572 |
| 5,611,260 A * | 3/1997 | Kanari et al. | 92/248 |
| 5,921,553 A * | 7/1999 | Klein | 277/492 |
| 6,129,358 A * | 10/2000 | Kiesel et al. | 277/436 |
| 6,322,080 B1 * | 11/2001 | Feistel | 277/490 |
| 6,428,014 B2 * | 8/2002 | Scarlett | 277/435 |
| 6,863,277 B2 * | 3/2005 | Wirth et al. | 277/434 |
| 7,121,552 B2 * | 10/2006 | Asadi et al. | 277/437 |
| 7,234,704 B2 * | 6/2007 | Lehr et al. | 277/436 |
| 7,510,195 B2 * | 3/2009 | Usui et al. | 277/435 |
| 8,177,237 B2 * | 5/2012 | Lindner-Silwester et al. | 277/487 |
| 2003/0122317 A1 * | 7/2003 | Andersson | 277/440 |
| 2005/0051970 A1 * | 3/2005 | Edelmann | 277/435 |
| 2009/0066034 A1 * | 3/2009 | Jordan | 277/518 |

FOREIGN PATENT DOCUMENTS

| | | |
|---|---|---|
| JP | 5733253 Y2 | 7/1982 |
| JP | 63-37867 U | 3/1988 |
| JP | 4-52657 U | 5/1992 |
| JP | 2000-035147 A | 2/2000 |
| JP | 2008-138805 A | 6/2008 |
| JP | 2010-014201 A | 1/2010 |
| JP | 2010-133511 A | 6/2010 |

* cited by examiner

PISTON BEARING STRUCTURE FOR FLUID PRESSURE CYLINDER

TECHNICAL FIELD

This invention relates to a piston bearing structure for a fluid pressure cylinder whose piston is supported in a cylinder tube.

BACKGROUND ART

A known piston bearing structure for a fluid pressure cylinder is such that a piston is supported in a cylinder tube via one seal ring and two wear rings sandwiching this seal ring.

As the seal ring of this type, JP2010-14201A and JP2008-138805A disclose a seal ring including two pairs of lips projecting to the inner and outer peripheries thereof and having an X-shaped cross-sectional shape.

On the other hand, the wear rings of this type fulfill a backup function of supporting the seal ring so that the lips does not protrude from a housing groove and a bearing function of slidably supporting the piston relative to the cylinder tube.

Further, a pressure difference between the piston and the cylinder tube and between opposite sides of the wear rings is suppressed by defining clearances around the wear rings, thereby preventing the wear rings from being deformed due to the pressure difference when the fluid pressure cylinder extends and contracts.

SUMMARY OF THE INVENTION

A backup wear ring including a backup ring portion which fulfills a backup function and a wear ring portion which fulfills a bearing function and having an L-shaped cross-sectional shape is used as the wear ring in some cases.

In this case, it is thought to suppress a pressure difference between the piston and the cylinder tube and between the opposite sides of the backup wear ring when the fluid pressure cylinder extends and contracts by providing a gap opening in the wear ring portion and bias cutting the backup ring portion to form a gap opening.

However, depending on an operating state of the fluid pressure cylinder, the piston may be inclined with respect to a center axis of the cylinder tube. In such a case, the bias cut gap opening of the backup ring portion may be closed even if the above gap opening is provided.

If the bias cut gap opening is closed, there is a possibility of a so-called pressure accumulating phenomenon in which a working fluid is trapped between the backup ring portion and the seal ring.

If the pressure accumulating phenomenon occurs, there is a possibility that the pressure difference between the opposite sides of the backup wear ring increases, a part of the backup ring portion is deformed and protrudes from the housing groove of the piston and the bearing function of the backup wear ring is impaired.

The present invention aims to provide a piston bearing structure for a fluid pressure cylinder capable of preventing a pressure accumulating phenomenon even in the case of using backup wear rings having an L-shaped cross-sectional shape.

According to one aspect of the present invention, a piston bearing structure for a fluid pressure cylinder in which a piston is supported in a cylinder tube is provided which comprises one seal ring housed in a housing groove of the piston and held in sliding contact with the cylinder tube; and two backup wear rings housed in the housing groove, held in sliding contact with the cylinder tube and sandwiching the seal ring; wherein: the housing groove includes a deep groove which houses the seal ring and two shallow grooves which is connected to opposite sides of the deep groove; the backup wear ring has an L-shaped cross-sectional shape including a wear ring portion which is housed in the shallow groove and is adapted to receive a load of the piston and a backup ring portion which is housed in the deep groove and faces the seal ring; the wear ring portion includes a pair of opening end portions to faun an gap opening; the backup ring portion includes a pair of bias cut opening end portions held in contact with each other; the backup wear ring includes a pressure relief groove which faces the housing groove and extends over the backup ring portion and the wear ring portion; and the pressure relief groove allows opposite sides of the backup wear ring to communicate between the piston and the cylinder tube.

Embodiments of the present invention and advantages thereof are described in detail below with reference to the accompanying drawings.

EMBODIMENTS OF THE INVENTION

Hereinafter, embodiments of the present invention are described based on the accompanying drawings.

Figure 1:
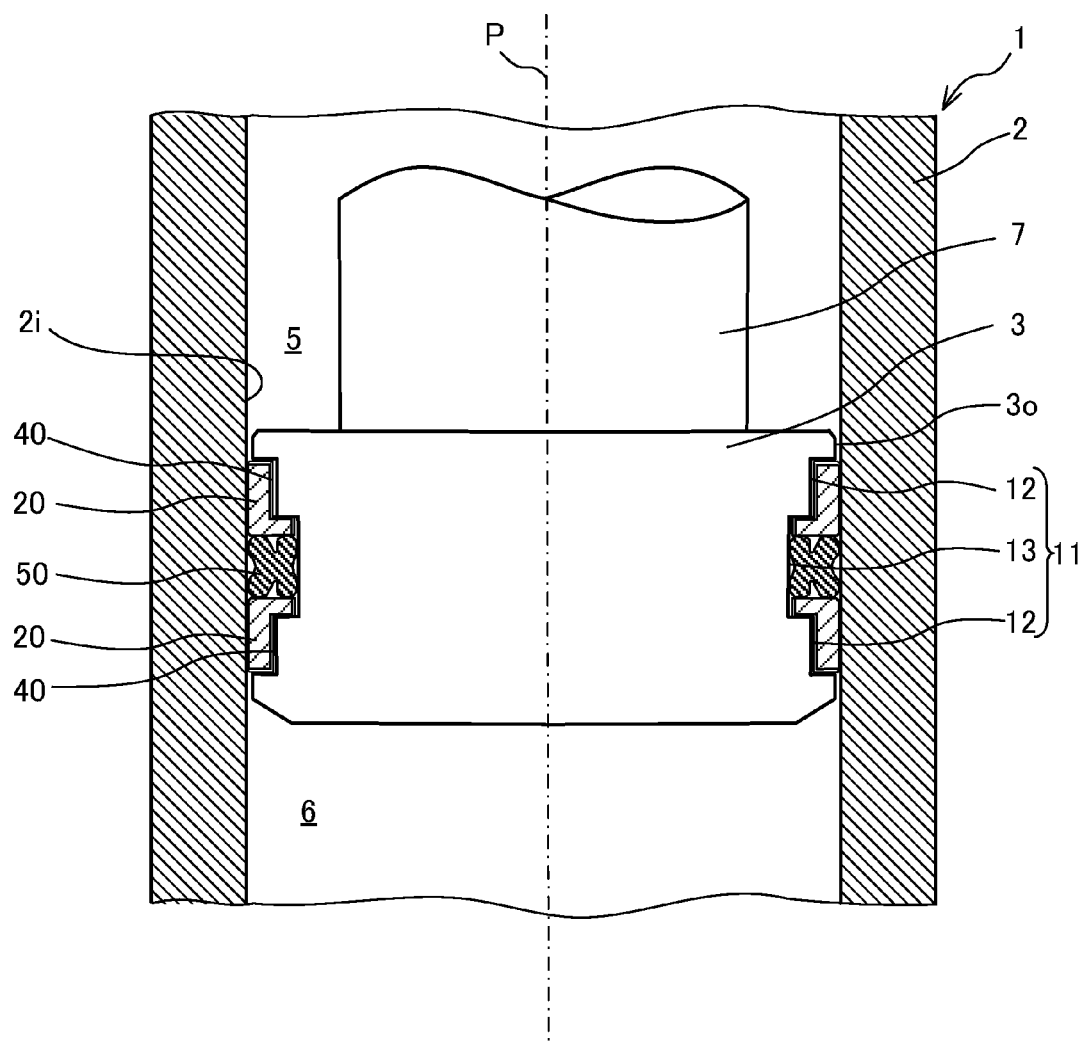
FIG. 1 is a vertical sectional view of a fluid pressure cylinder showing an embodiment of the present invention.
Figure 2:
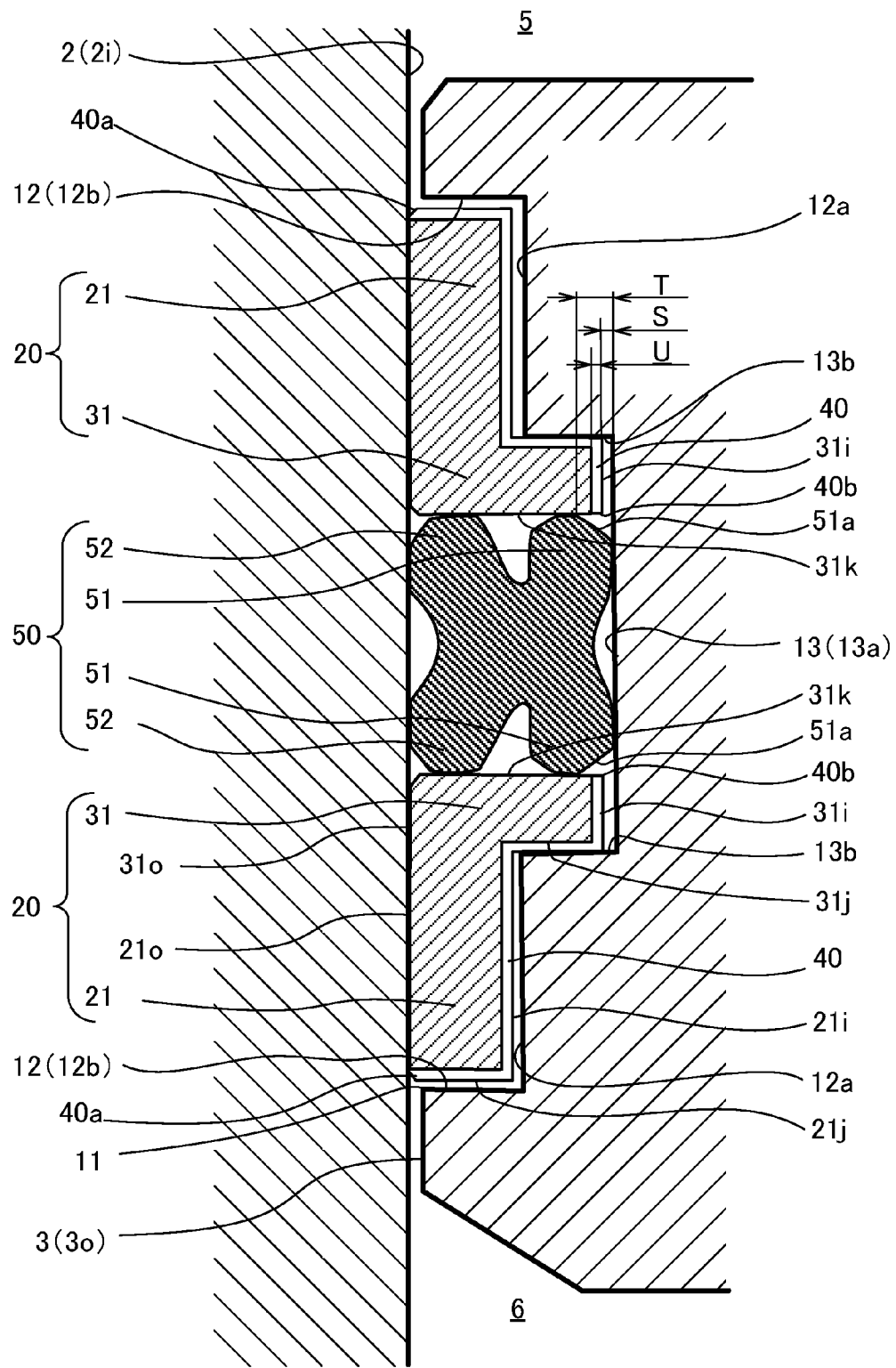
FIG. 2 is a partial enlarged vertical sectional view of the fluid pressure cylinder of FIG. 1.

FIGS. 1 and 2 are vertical sectional views showing a part of a fluid pressure cylinder (hydraulic cylinder) 1. The fluid pressure cylinder 1 is used as an actuator for driving a load such as an operating machine, a construction machine, another machine or equipment.

Oil is used as a working fluid in the fluid pressure cylinder 1. An operating fluid (fluid) such as a water-soluble alternative fluid may be used instead of the oil.

The fluid pressure cylinder 1 includes a cylindrical cylinder tube 2, a piston 3 slidably housed inside the cylinder tube 2, a piston rod 7 linked to the piston 3 and a cylinder head slidably supporting the piston rod 7 relative to the cylinder tube 2. The cylinder tube 2, the piston rod 7, the piston 3 and the cylinder head are coaxially arranged with respect to a center axis P.

In the fluid pressure cylinder 1, the interior of the cylinder tube 2 is partitioned into a rod side fluid pressure chamber 5 and an end side fluid pressure chamber 6 by the piston 3. The rod side fluid pressure chamber 5 and the end side fluid pressure chamber 6 communicate with a fluid pressure unit via pipes. The single-acting fluid pressure cylinder 1 extends by a pressurized working fluid supplied from the fluid pressure unit being introduced into the end side fluid pressure chamber 6 and contracts by the pressurized working fluid introduced into the rod side fluid pressure chamber 5.

Between the outer periphery of the piston 3 and an inner peripheral surface 2i of the cylinder tube 2, a backup wear ring (wear ring) 20, a seal ring 50, a backup wear ring (wear ring) 20 are provided in this order from top in FIG. 1.

A housing groove 11 extending annularly is formed in an outer peripheral surface 3o of the piston 3, and each backup wear ring 20 and the seal ring 50 are housed in this housing groove 11.

The housing groove 11 includes one deep groove 13 and two shallow grooves 12 connected to opposite sides of the deep groove 13. The seal ring 50 is housed in the deep groove 13 in the center, and each backup wear ring 20 is housed in the deep groove 13 and the upper or lower shallow groove 12.

The shallow groove 12 and the deep groove 13 have an L-shaped cross-sectional shape formed by uniting two rectangles. Bottom surfaces 12a of the shallow grooves 12 and a bottom surface 13a of the deep groove 13 are respectively formed into right cylindrical surfaces about the center axis P. The side surfaces 12b of the shallow grooves 12 and opposite side surfaces 13b of the deep groove 13 are respectively formed into flat surfaces substantially perpendicular to the center axis P.

The seal ring 50 has an X-shaped cross-sectional shape and is annularly foamed. The seal ring 50, including two pairs of lips 51, 52 projecting to the inner and outer peripheries, is substantially line symmetrically formed.

The seal ring 50 is made of a resin material, e.g. urethane rubber.

The lips 51, 52 of the seal ring 50 expand relative to each other due to an elastic restoring force and a fluid pressure of the seal ring 50, each lip 51 on the inner periphery is in contact with the bottom surface 13a of the deep groove 13 over the entire circumference and each lip 52 on the outer periphery is held in sliding contact with the inner peripheral surface 2i of the cylinder tube 2 over the entire circumference. Thus, the seal ring serves as the seal between the rod side fluid pressure chamber 5 and the end side fluid pressure chamber 6.

An O-ring having a substantially circular cross-sectional shape may be used as the seal ring 50.

The backup wear ring 20, having an L-shaped cross-sectional shape, is annularly formed. The backup wear ring 20 includes a wear ring portion 21 which is housed in the shallow groove 12 and receives a load of the piston 3 and a backup ring portion 31 which is housed in the deep groove 13 and faces the seal ring 50.

The backup wear ring 20 is formed of a resin material, e.g. nylon and has higher rigidity than the seal ring 50.

Figure 3:
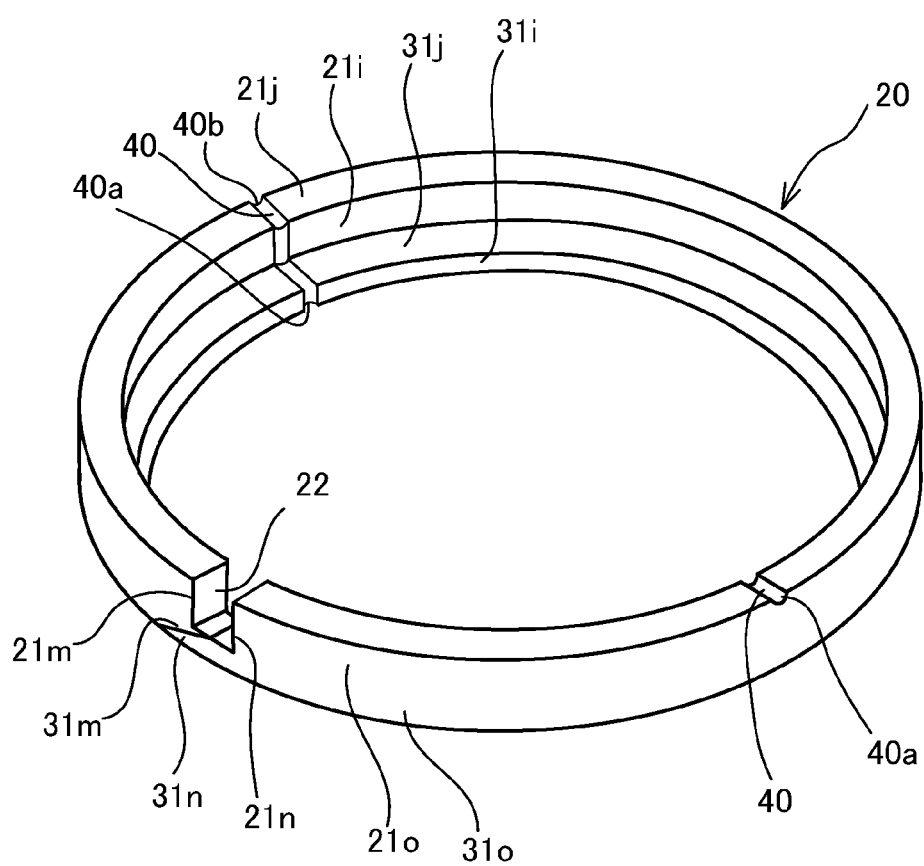
FIG. 3 is a perspective view of a backup wear ring.

FIG. 3 is a perspective view of the backup wear ring 20. The wear ring portion 21 is formed into a ring including an gap opening 22 defined by opening end portions 21m and 21n. The backup wear ring 20 is fitted into the housing groove 11 with the gap opening 22 widened.

The wear ring portion 21 has a rectangular cross-sectional shape which is one side of an L shape and includes an inner peripheral surface 21i, an outer peripheral surface 21o and a side surface 21j. The inner and outer peripheral surfaces 21i, 21o are respectively formed into right cylindrical surfaces about the center axis P. The side surface 21j is formed into a flat surface substantially perpendicular to the center axis P.

The opening end portions 21m, 21n of the wear ring portion 21 are formed into flat surfaces facing each other. As shown in FIG. 1, an elastic restoring force acts to open the backup wear ring 20 radially outwardly with the backup wear ring 20 mounted in the cylinder tube 2, and this elastic restoring force separates the opening end portions 21m, 21n from each other, thereby defining the gap opening 22.

Since the wear ring portion 21 is so formed that the thickness (radial dimension) thereof is larger than the depth (radial dimension) of the shallow grooves 12, the outer peripheral surface 21o protrudes from the housing groove 11 in an outward radial direction of the piston 3 and is held in sliding contact with the inner peripheral surface 2i of the cylinder tube 2. Thus, the wear ring portion 21 fulfills a bearing function of slidably supporting the piston 3 relative to the cylinder tube 2.

The backup ring portion 31 has a rectangular cross-sectional shape which forms one side of the L shape and includes an inner peripheral surface 31i, an outer peripheral surface 31o, a rear surface (side surface) 31j and a backup surface (side surface) 31k. The inner and outer peripheral surfaces 31i, 31o are respectively formed into right cylindrical surfaces about the center axis P. The outer peripheral surface 31o is evenly connected to the outer peripheral surface 21o of the wear ring portion 21. The rear surface 31j and the backup surface 31k are formed into flat surfaces substantially perpendicular to the center axis P.

The backup wear ring 20 fulfills a backup function of supporting the seal ring 50 so that the lips 52 pressed by the backup surface 31k do not protrude over the inner peripheral surface 2i of the cylinder tube 2 and the lips 51 do not protrude over the bottom surface 13a of the deep groove 13.

The backup ring portion 31 includes a pair of bias cut opening end portions 31m, 31n held in contact with each other. Since the end surfaces of the bias cut opening end portions 31m, 31n are formed into tapers inclined with respect to the center axis P, these end surfaces are kept in contact with each other and no clearance is formed therebetween even if the backup wear ring 20 is opened radially outwardly. Thus, the backup ring portion 31 fulfills a backup function of supporting the seal ring 50 so that the lips 51, 52 pressed by the backup surface 31k do not protrude between the bias cut opening end portions 31m, 31n.

As shown in FIG. 2, the seal ring 50 is formed with annular chamfered portions on leading end corners of the lips 51, 52 on the inner and outer peripheries. For example, the chamfered portions 51a are formed on the leading ends of the lips 51 on the inner periphery. As shown in FIG. 2, distance from the bottom surface 13a of the deep groove 13 to the outer peripheral ends of the chamfered portions 51a with the seal ring 50 mounted in the housing groove 11 is a chamfer width T. The chamfer width T is optionally set.

The backup wear ring 20 is, as shown in FIG. 2, such that a clearance S is provided between the inner peripheral surface 31i of the backup ring portion 31 and the bottom surface 13a of the deep groove 13 in a state where the outer peripheral surface 31o of the backup ring portion 31 is held in contact with the inner peripheral surface 2i of the cylinder tube 2.

When the fluid pressure cylinder 1 extends or contracts, the outer peripheral surfaces 21o, 31o slide in contact with the inner peripheral surface 2i of the cylinder tube 2 and the inner peripheral surfaces 21i, 31i move away from the bottom surfaces 12a of the shallow grooves 12 and the bottom surface 13a of the deep groove 13 due to the elastic restoring force of the backup wear ring 20. Since this enables the working fluid to pass through clearances defined between the inner peripheral surfaces 21i, 31i and the bottom surfaces 12a of the shallow grooves 12, the bottom surface 13a of the deep groove 13, the working fluid is not trapped between the backup wear ring 20 and the seal ring 50.

Depending on the operating state of the fluid pressure cylinder 1, the piston 3 is inclined with respect to the center axis P, whereby outer peripheral parts of the backup ring portions 31 may be held in sliding contact with the inner peripheral surface 2i of the cylinder tube 2 over the entire circumference and the rear surfaces 31j of the backup ring portions 31 may be held in contact with the side surfaces 13b of the deep groove 13 over the entire circumference. This may possibly close a clearance between the bias cut opening end portions 31m, 31n.

If the clearance between the bias cut opening end portions 31m, 31n is closed as described above with respect to a conventional backup wear ring, a pressure accumulating phenomenon in which a working fluid is trapped between the backup wear ring and the seal ring may possibly occur. If the pressure accumulating phenomenon occurs, there is a possibility that a pressure difference between the opposite sides of the backup wear ring increases, a part of the backup wear ring is deformed and protrudes from a housing groove of a piston and a bearing function of the backup wear ring is impaired.

Contrary to this, pressure relief grooves 40 in this embodiment are formed in the backup wear ring 20 as shown in FIG. 1. These pressure relief grooves 40 allow the opposite sides of the backup wear ring 20 to communicate between the piston 3 and the cylinder tube 2.

As shown in FIG. 3, the pressure relief groove 40 is formed to extend in a bent manner from the inner peripheral surface 31i of the backup ring portion 31 to the side surface 21j via the rear surface 31j and the inner peripheral surface 21i of the wear ring portion 21.

One end 40a of the pressure relief groove 40 is open in the backup surface 31k of the backup ring portion 31 and another end 40b thereof is open in the outer peripheral surface 21o of the wear ring portion 21.

Figure 4:
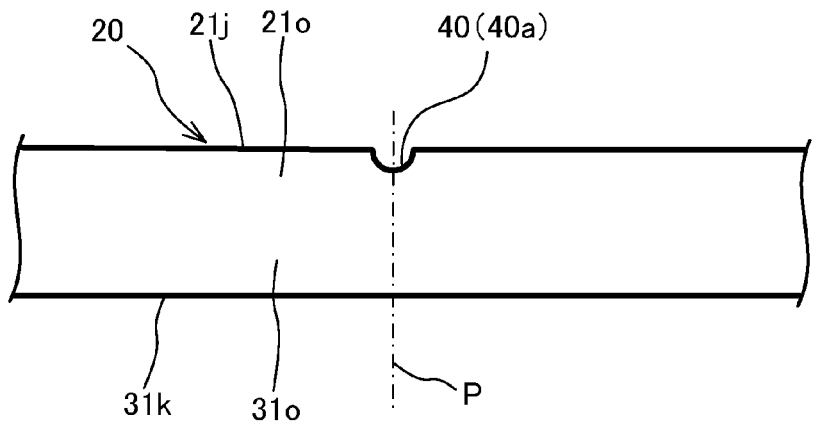
FIG. 4 is a side view of the backup wear ring.

The pressure relief groove 40 has a substantially semicircular cross-sectional shape as shown in FIG. 4.

As described above, if the opening width of a clearance provided between the inner peripheral surface 31 i of the backup ring portion 31 and the bottom surface 13a of the deep groove 13 is an inner peripheral clearance S of the backup ring portion 31 and a distance from the bottom surface 13a of the deep groove 13 to the outer peripheral ends of the chamfered portions 51a of the lips 51 of the seal ring 50 is the chamfer width T in FIG. 2, a depth U of the pressure relief groove 40 is set to satisfy the following equation.

$$U+S<T$$

$$U<T-S \quad (1)$$

The depth U of the pressure relief groove 40 is therefore set to be smaller than a difference between the chamfer width T and the inner peripheral clearance S of the backup ring portion 31.

Thus, a part of the chamfered portion 51a of the lip 51 faces to cover an opening of the pressure relief groove 40, thereby preventing a part of the lip 51 from protruding over the pressure relief groove 40.

As shown in FIG. 3, the backup wear ring 20 is formed with two pressure relief grooves 40. Each pressure relief groove 40 is fainted at an angle position of about 90° with respect to the gap opening 22 about the center axis P.

Without being limited to this, the backup wear ring 20 may be fat need with one pressure relief groove 40. In this case, the pressure relief groove 40 is formed at an angle position of about 180° with respect to the gap opening 22 about the center axis P.

Further, the backup wear ring 20 may be formed with three or more pressure relief grooves 40.

The piston bearing structure for the fluid pressure cylinder 1 is configured as described above. Thus, the pressure relief grooves 40 allow the opposite sides of the backup wear rings 20 to communicate between the piston 3 and the cylinder tube 2 also in such an operating state that clearances around the backup ring portions 31 are closed. Pressure difference produced between the opposite sides of the backup wear rings 20 can be suppressed due to the working fluid trapped between the backup wear rings 20 and the seal ring 50. This can prevent parts of the backup wear rings 20 from being deformed and protruding from the housing groove 11, wherefore the bearing function of the backup wear rings 20 can be maintained.

As shown in FIG. 4, the pressure relief groove 40 has a substantially semicircular cross-sectional shape.

Figure 5:
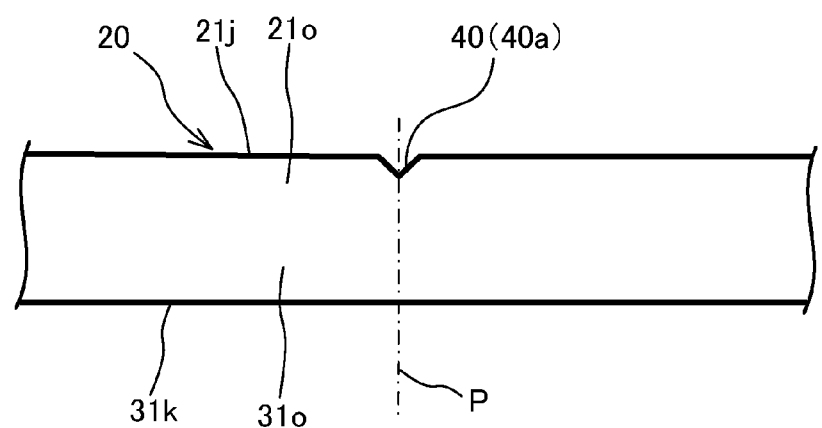
FIG. 5 is a side view of a backup wear ring in another embodiment.

As shown in FIG. 5, the pressure relief groove 40 may have a substantially triangular cross-sectional shape.

Figure 6:
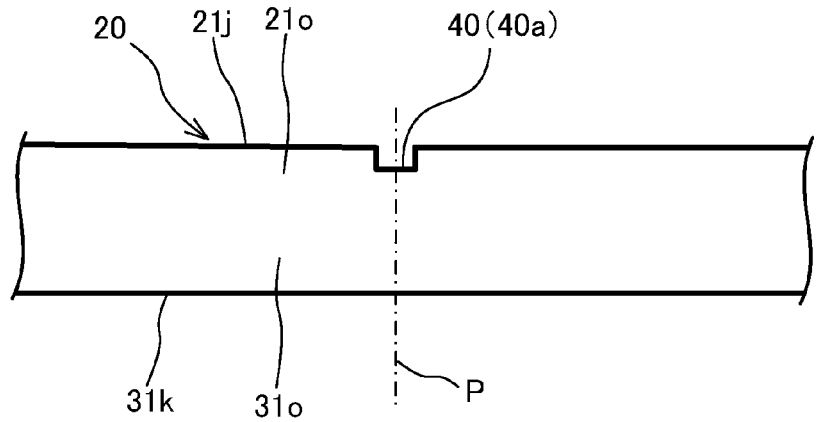
FIG. 6 is a side view of a backup wear ring in another embodiment.

As shown in FIG. 6, the pressure relief groove 40 may have a substantially rectangular cross-sectional shape.

The summary, functions and effects of this embodiment are described below.

The piston bearing structure for the fluid pressure cylinder 1 in which the piston 3 is supported in the cylinder tube 2 is such that one seal ring 50 held in sliding contact with the cylinder tube 2 and two backup wear rings 20 sandwiching this seal ring 50 are housed in the housing groove 11 of the piston 3. The housing groove 11 includes the deep groove 13 for housing the seal ring 50 and the two shallow grooves 12 connected to the opposite sides of the deep groove 13. The backup wear ring 20 has the L-shaped cross-sectional shape, including the wear ring portion 21 housed in the shallow groove 12 and adapted to receive a load of the piston 3 and the backup ring portion 31 housed in the deep groove 13 and facing the seal ring 50. The wear ring portion 21 includes a pair of opening end portions 21m, 21n forming the gap opening 22, and the backup ring portion 31 includes the pair of bias cut opening end portions 31m, 31n held in contact with each other. The backup wear ring 20 includes the pressure relief grooves 40 facing the housing groove 11 and extending over the backup ring portion 31 and the wear ring portion 21. The pressure relief grooves 40 allow the opposite sides of the backup wear ring 20 to communicate between the piston 3 and the cylinder tube 2.

Thus, the pressure relief grooves 40 allow the opposite sides of the backup wear ring 20 to communicate between the piston 3 and the cylinder tube 2 even during an operation in which the clearances around the backup ring portion 31 are closed. This can prevent a part of the backup wear ring 20 from being deformed and protruding from the housing groove 11 and maintain the bearing function of the backup wear ring 20.

Since the pressure relief grooves 40 faces the housing groove 11 and are open and have no part held in sliding contact with the inner peripheral surface 2i of the cylinder tube 2, the pressure relief grooves 40 can be prevented from being clogged with sludge and the like, and the communicating state of the pressure relief grooves 40 can be maintained.

It is also thought to form pressure relief grooves which are open in the outer peripheral surfaces 21o, 31o of the cylinder tube 2, but there is a possibility of clogging the pressure relief grooves with sludge and the like, since opening edges of the pressure relief grooves are held in sliding contact with the inner peripheral surface 2i of the cylinder tube 2 in such a case.

In this embodiment, the seal ring 50 has the X-shaped cross-sectional shape including two pairs of lips 51, 52 projecting to the inner and outer peripheries thereof, and the lips 51 projecting to the inner periphery are formed with the annular chamfered portions 51a held in contact with the bottom surface 13a of the deep groove 13. If the distance from the bottom surface 13a of the deep groove 13 to the outer peripheral edges of the chamfered portions 51a is the chamfer width T of the seal ring 50 and the opening width of the clearance provided between the inner peripheral surface 31*i* of the backup ring portion 31 and the bottom surface 13*a* of the deep groove 13 is the clearance S, the depth U of the pressure relief grooves 40 is set to be smaller than the difference between the chamfer width T of the seal ring 50 and the inner peripheral clearance S of the backup ring portion 31.

Since the lips 51 face the pressure relief grooves 40 such that parts of the chamfered portions 51*a* cover the openings of the pressure relief grooves 40 in this way, it can be prevented that parts of the lips 51 protrude over the pressure relief grooves 40.

The embodiments of the present invention described above are merely illustration of some application examples of the present invention and not of the nature to limit the technical scope of the present invention to the specific constructions of the above embodiments.

The present application claims a priority based on Japanese Patent Application No. 2011-63703 filed with the Japan Patent Office on Mar. 23, 2011, all the contents of which are hereby incorporated by reference.

The invention claimed is:

1. A piston bearing structure for a fluid pressure cylinder in which a piston is supported in a cylinder tube, the piston bearing structure comprising:
   one seal ring housed in a housing groove of the piston and held in sliding contact with the cylinder tube; and
   two backup wear rings housed in the housing groove, held in sliding contact with the cylinder tube and sandwiching the seal ring,
   wherein
   the housing groove includes
      a first groove which houses the seal ring, and
      two second grooves which are shallower than the first groove and connected to opposite sides of the first groove, and
   each of the backup wear rings has an L-shaped cross-sectional shape including
      a wear ring portion which is housed in a corresponding one of the second-grooves and is adapted to receive a load of the piston, and
      a backup ring portion which is housed in the first groove, faces the seal ring and is integrally formed with the wear ring portion,
   wherein
   the wear ring portion includes a pair of opening end portions to form a gap opening,
   the backup ring portion includes a pair of bias cut opening end portions which are held in contact with each other in a state where the gap opening is maintained,
   the backup wear ring includes a pressure relief groove which faces the housing groove and extends over the backup ring portion and the wear ring portion, and
   the pressure relief groove allows opposite sides of the backup wear ring to communicate between the piston and the cylinder tube, and faces the housing groove over an entire extent of the pressure relief groove in the backup ring portion and the wear ring portion.

2. The piston bearing structure for the fluid pressure cylinder according to claim 1, wherein
   the seal ring has an X-shaped cross-sectional shape including two pairs of lips projecting to inner and outer peripheries of the seal ring,
   the lips projecting to the inner periphery of the seal ring are formed with an annular chamfered portion held in contact with a bottom surface of the first groove,
   a depth U of the pressure relief groove is smaller than a difference between
      (i) a chamfer width T that is a distance from the bottom surface of the first groove to outer peripheral ends of the chamfered portions and
      (ii) a clearance S that is an opening width of a clearance provided between an inner peripheral surface of the backup ring portion and the bottom surface of the first groove, and
   an end of the pressure relief groove faces a part of the chamfered portion.

3. The piston bearing structure for the fluid pressure cylinder according to claim 1, wherein
   in a cross-section along an axial direction of each of the backup wear rings, the pressure relief groove extends continuously over an entire extent in which the backup wear ring faces the housing groove.

4. The piston bearing structure for the fluid pressure cylinder according to claim 1, wherein, in each of the backup wear rings,
   the bias cut opening end portions are inclined with respect to an axis of said backup wear ring, and
   when the bias cut opening end portions are held in contact with each other, the opening end portions are spaced from each other by said gap opening in a circumferential direction of said backup wear ring.

5. The piston bearing structure for the fluid pressure cylinder according to claim 4, wherein
   each of the second grooves includes
      a side surface, and
      a bottom surface connected to the side surface,
   the first groove includes
      opposite side surfaces respectively connected to the bottom surfaces of the second grooves, and
      a bottom surface between the opposite side surfaces and connected to the opposite side surfaces, and
   in a cross-section along an axial direction of each of the backup wear rings, the pressure relief groove extends continuously over an entire extent in which the backup wear ring faces
      the side surface of the corresponding second groove,
      the bottom surface of the corresponding second groove,
      a corresponding one of the opposite side surfaces of the first groove, and
      the bottom surface of the first groove.

* * * * *